(12) United States Patent
Miyazawa (10) Patent No.: US 8,170,337 B2
(45) Date of Patent: May 1, 2012

(54) VIDEO PROCESSING APPARATUS AND VIDEO PROCESSING METHOD

(75) Inventor: Hirotoshi Miyazawa, Fukaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 7 days.

(21) Appl. No.: 12/822,079

(22) Filed: Jun. 23, 2010

(65) Prior Publication Data

US 2011/0058738 A1 Mar. 10, 2011

(30) Foreign Application Priority Data

Sep. 10, 2009 (JP) ................ 2009-209512

(51) Int. Cl.
*G06K 9/00* (2006.01)
(52) U.S. Cl. ...................... 382/168; 382/274
(58) Field of Classification Search ............... 382/168
See application file for complete search history.

(56) References Cited

U.S. PATENT DOCUMENTS

2010/0329553 A1* 12/2010 Shiokawa et al. ............ 382/167

FOREIGN PATENT DOCUMENTS

| JP | 05-75222 | 10/1993 |
|---|---|---|
| JP | 2000-089531 | 3/2000 |
| JP | 2002-366121 | 12/2002 |
| JP | 2004-272275 | 9/2004 |
| JP | 2005-012659 | 1/2005 |
| JP | 2005-130484 | 5/2005 |
| JP | 2007-036946 | 2/2007 |
| JP | 2007-272023 | 10/2007 |

* cited by examiner

*Primary Examiner* — Vu Le
*Assistant Examiner* — Michael Vanchy, Jr.
(74) *Attorney, Agent, or Firm* — Patterson & Sheridan, LLP (57) ABSTRACT

According to one embodiment, a video processing apparatus includes a histogram generator, a tone curve generator, a blend parameter generator, and a blending module. The histogram generator generates a histogram based on a luminance level of a pixel of a video signal. The tone curve generator generates a first tone curve which controls a luminance value of the video signal based on the histogram. The blend parameter generator generates a blend parameter for blending the first tone curve and a prescribed tone curve, based on the histogram. The blending module blends the first tone curve and the prescribed tone curve based on the blend parameter to generate a second tone curve.

6 Claims, 5 Drawing Sheets

VIDEO PROCESSING APPARATUS AND VIDEO PROCESSING METHOD

CROSS-REFERENCE TO RELATED APPLICATIONS

This application is based upon and claims the benefit of priority from Japanese Patent Application No. 2009-209512, filed Sep. 10, 2009; the entire contents of which are incorporated herein by reference.

FIELD

Embodiments described herein relate generally to a video processing apparatus which controls a contrast of video and a video processing method applied to the video processing apparatus.

BACKGROUND

There have been proposed various techniques for performing tone correction on a luminance component of a video signal, thereby to make video clearly visible. Tone correction is made based on, for example, a histogram of luminance of video.

Jpn. Pat. Appln. KOKAI Publication No. 2007-36946 discloses a video signal processing apparatus which performs a frequency conversion process on the histogram of luminance, and performs a non-linear correction process on a video signal based on the processed histogram of luminance. In this video signal processing apparatus, the range of control of the tone correction process on the luminance is made variable by the frequency conversion process on the histogram of luminance.

In the meantime, in some cases, a video content of, e.g. a television broadcast program includes video in which the luminance level of a black pixel is set to be higher than a pedestal level. With respect to such video including a dark scene, the viewer may possibly perceive black-floating in displayed video. The viewer may have unnaturalness in viewing a dark region in the video, which is displayed not in jet black, but is displayed rather light.

DETAILED DESCRIPTION

In general, according to one embodiment, a video processing apparatus includes a histogram generator configured to generate a histogram based on a luminance level of a pixel of a video signal, a tone curve generator configured to generate a first tone curve which controls a luminance value of the video signal based on the histogram, a blend parameter generator configured to generate a blend parameter for blending the first tone curve and a prescribed tone curve, based on the histogram, and a blending module configured to blend the first tone curve and the prescribed tone curve based on the blend parameter to generate a second tone curve.

Figure 1:
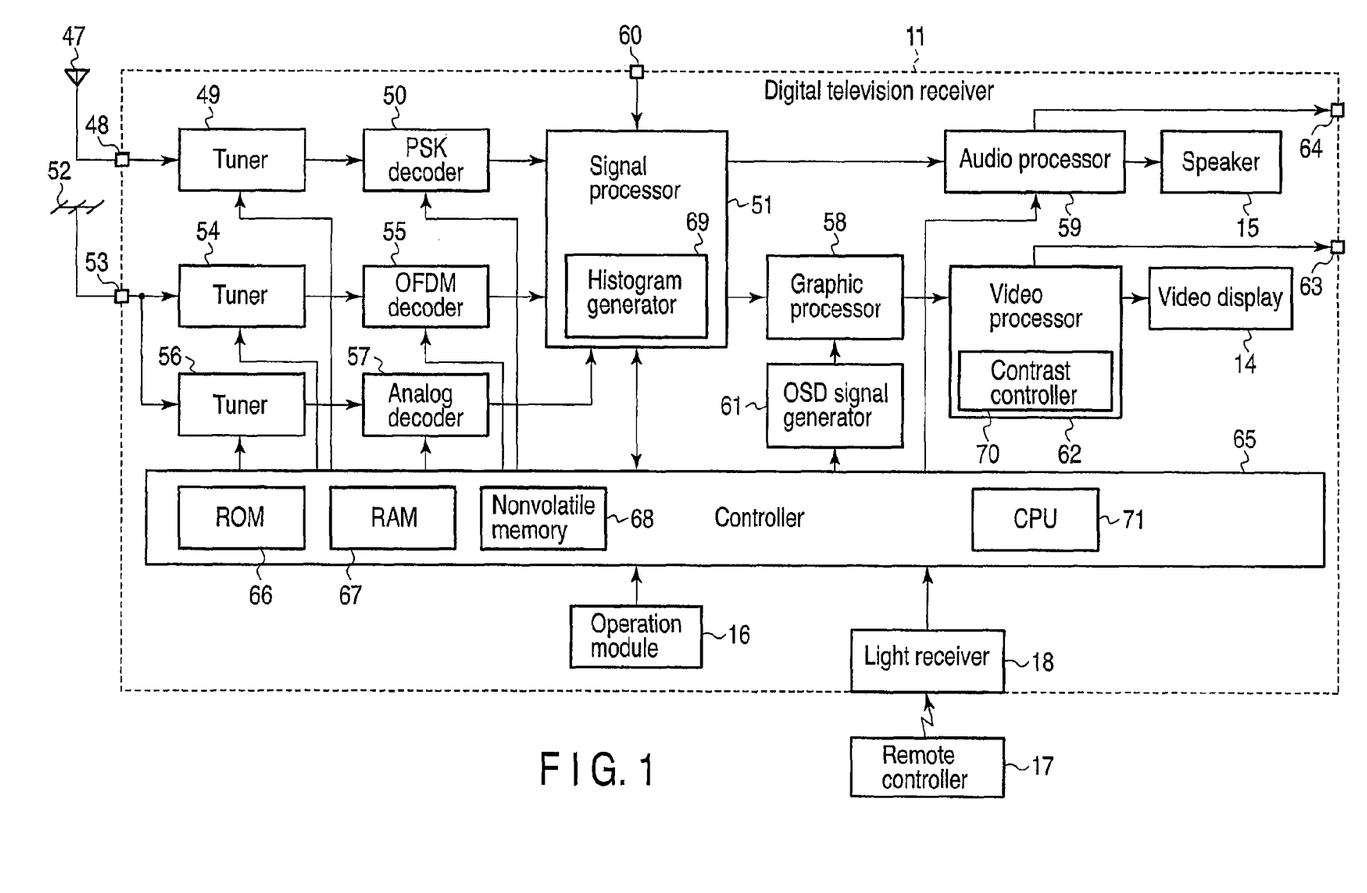
FIG. 1 is an exemplary block diagram showing the structure of a video processing apparatus according to an embodiment.

To begin with, referring to FIG. 1, a description is given of a digital television receiver 11 as an example of a video processing apparatus according to an embodiment.

The digital television receiver 11 includes a video display 14, a speaker 15, an operation module 16, a light receiver 18, broadcast signal input terminals 48 and 53, an analog signal input terminal 60, output terminals 63 and 64, tuners 49, 54 and 56, a PSK decoder 50, an OFDM decoder 55, an analog decoder 57, a signal processor 51, an audio processor 59, a graphic processor 58, a video processor 62, an OSD signal generator 61, and a controller 65.

A BS/CS digital broadcast receiving antenna 47 and a terrestrial broadcast receiving antenna 52 are connected to the broadcast signal input terminal 48 and broadcast signal input terminal 53, respectively. The light receiver 18 receives a signal output from a remote controller 17.

The controller 65 controls the operations of the respective components in the digital television receiver 11. The controller 65 includes a CPU 71, a ROM 66, a RAM 67, and a nonvolatile memory 68. The ROM 66 stores a control program executed by the CPU 71. The nonvolatile memory 68 stores various setting information and control information. The CPU 71 loads instructions and data, which are necessary for processes, in the RAM 67, and executes the processes.

The controller 65 receives operation information from the operation module 16, or operation information from the remote controller 17, which is received by the light receiver 18. The controller 65 executes control of the respective components, with the contents of the operation information being reflected on the control.

The BS/CS digital broadcast receiving antenna 47 receives a satellite digital television broadcast signal. The BS/CS digital broadcast receiving antenna 47 outputs the received satellite digital television broadcast signal to the tuner 49 for satellite digital broadcast via the input terminal 48. The tuner 49 selects, from this broadcast signal, a broadcast signal of a channel which is selected by the user. The tuner 49 outputs the selected broadcast signal to the phase shift keying (PSK) decoder 50. The PSK decoder 50 decodes the broadcast signal, which is selected by the tuner 49, to a digital video signal and audio signal. The PSK decoder 50 outputs the decoded digital video signal and audio signal to the signal processor 51.

The terrestrial broadcast receiving antenna 52 receives a terrestrial digital television broadcast signal and a terrestrial analog television broadcast signal. The terrestrial broadcast receiving antenna 52 outputs the terrestrial digital television broadcast signal to the tuner 54 via the input terminal 53. The tuner 54 selects, from this broadcast signal, a broadcast signal of a channel which is selected by the user. The tuner 54 outputs the selected broadcast signal to the orthogonal frequency division multiplexing (OFDM) decoder 55. The OFDM decoder 55 decodes the selected broadcast signal to a digital video signal and audio signal. The OFDM decoder 55 outputs the decoded digital video signal and audio signal to the signal processor 51.

In addition, the terrestrial broadcast receiving antenna 52 outputs the terrestrial analog television broadcast signal to the tuner 56 for terrestrial analog broadcast via the input terminal 53. The tuner 56 selects, from this broadcast signal, a broadcast signal of a channel which is selected by the user. The tuner 56 outputs the selected broadcast signal to the analog decoder 57. The analog decoder 57 decodes the broadcast signal, which is selected by the tuner 56, to an analog video signal and audio signal. The analog decoder 57 outputs the decoded analog video signal and audio signal to the signal processor 51.

The input terminal 60 is connected to the signal processor 51. The input terminal 60 is a terminal for putting an analog video signal and audio signal from the outside to the digital television receiver 11. The signal processor 51 converts an analog video signal and audio signal, which are input from the analog decoder 57 or input via the input terminal 60, to a digital video signal and audio signal.

The signal processor 51 executes a predetermined digital signal process on the converted digital video signal and audio signal, and on the digital video signal and audio signal which are input from the PSK decoder 50 or OFDM decoder 55. The signal processor 51 outputs the video signal and audio signal, which are subjected to the predetermined digital signal process, to the graphic processor 58 and audio processor 59.

The audio processor 59 converts the input digital audio signal to an analog audio signal which can be reproduced by the speaker 15. The audio processor 59 outputs the analog audio signal to the speaker 15. Based on the input analog audio signal, the speaker 15 reproduces audio. The audio processor 59 may also output the analog audio signal to the outside via the output terminal 64.

The graphic processor 58 superimposes an on-screen display (OSD) signal of, e.g. a menu, which is generated by the OSD signal generator 61, on the digital video signal output from the signal processor 51. The graphic processor 58 outputs the video signal, on which the OSD signal is superimposed, to the video processor 62. The graphic processor 58 may selectively output either the video signal output from the signal processor 51, or the OSD signal output from the OSD signal generator 61.

The video processor 62 converts the input digital video signal to an analog video signal which can be displayed on the video display 14 by executing a predetermined process on the input digital video signal. The video processor 62 outputs the analog video signal to the video display 14. Based on the input analog video signal, the video display 14 displays video. The video processor 62 may also output the analog video signal to the outside via the output terminal 63.

The signal processor 51 includes a histogram calculator 69. The video processor 62 includes a contrast controller 70. Of video signals which are to be processed, a luminance signal (Y) is input to the histogram calculator 69 in the signal processor 51. The histogram calculator 69 generates a histogram based on the luminance signal (Y). In the video processor 62, a video signal, which is composed of the luminance signal (Y), a chroma signal (Cb/Pb) and a chroma signal (Cr/Pr), is input to the contrast controller 70. The contrast controller 70 controls the contrast of the video signal based on the histogram generated by the histogram calculator 69.

The contrast controller 70 controls the contrast of the video signal according to a blended tone curve which is obtained by blending a first tone curve, which is set as a standard (prescribed) tone curve, and a second tone curve for dynamically controlling the contrast, based on a blend parameter. The first tone curve (or standard tone curve) is, for example, a tone curve which does not have contrast control so that an input luminance level is directly used as an output luminance level (i.e. a tone curve without contrast control effect). The second tone curve for dynamically controlling the contrast is, for example, a tone curve which has contrast control (i.e. a tone curve with a contrast control effect). In the second tone curve for dynamically controlling the contrast, for example, the magnitude of contrast control effect can be varied.

In the present embodiment, if a video image includes a dark scene, that is, if black-floating may possibly occur in the video, a process for improving the contrast of a dark region is applied to the video. Specifically, the contrast controller 70 uses, as an index indicating that the video includes a dark scene, the degree of concentration of pixels of a video frame at a low luminance level (size of dark region). If the size of dark region is large, the contrast controller 70 sets a blend parameter for the dark region of video so that the effect of the tone curve for dynamically controlling the contrast is greatly reflected and the effect of the standard tone curve is slightly reflected. On the other hand, if the size of dark region is small, the contrast controller 70 sets a blend parameter for the dark region of video so that the effect of the tone curve for dynamically controlling the contrast is slightly reflected and the effect of the standard tone curve is greatly reflected. The contrast controller 70 sets a blend parameter for a light region of video so that the effect of the tone curve for dynamically controlling the contrast and the effect of the standard tone curve are reflected at a predetermined ratio. This predetermined ratio is, for example, a value set by the user (or a value corresponding to a display mode set by the user), or a predetermined reference value.

Figure 2:
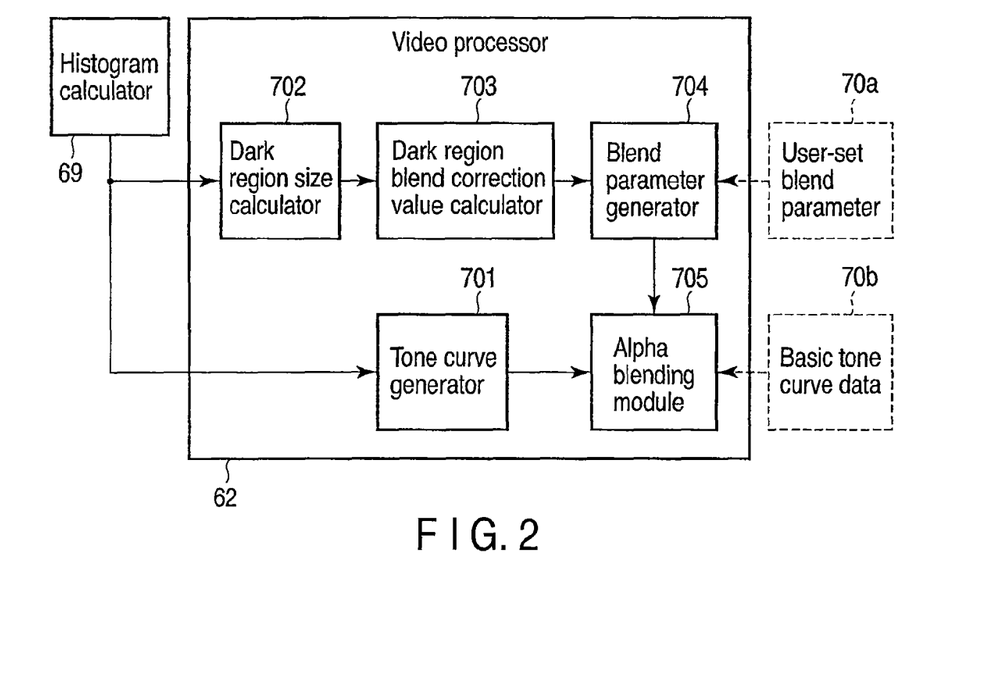
FIG. 2 is an exemplary block diagram showing the structure of a contrast controller and a histogram calculator in the video processing apparatus according to the embodiment.

FIG. 2 is a block diagram showing the configuration of the histogram calculator 69 and the contrast controller 70.

The contrast controller 70 includes a tone curve generator 701, a dark region size calculator 702, a dark region blend correction value calculator 703, a blend parameter generator 704, and an alpha blending module 705. The histogram calculator 69 inputs the calculated histogram to the tone curve generator 701 and dark region size calculator 702.

The tone curve generator 701 generates a tone curve $D_{tone}$ for dynamically controlling the contrast in accordance with the luminance histogram. The tone curve is indicative of the correspondence between the luminance of a pixel of an input video signal (input luminance level) and the luminance at a time when the pixel is displayed on the screen (output luminance level). Specifically, the output luminance level corresponding to the input luminance level is calculated based on the tone curve. Various methods relating to tone correction, which have been conventionally proposed, can be used for the generation of the tone curve $D_{tone}$ by the tone curve generator 701.

In addition, the tone curve generator 701 may generate the tone curve $D_{tone}$ for dynamically controlling the contrast, in accordance with a value designating the effect of contrast control, which is set through a menu screen or the like. For example, the user can select, from the menu screen, one of "strong", "middle", "weak", and "off" as the degree of the effect of the contrast control. Besides, the user may select, from the menu screen, a display mode such as a cinema mode or an animation mode. In this case, the tone curve generator 701 generates the tone curve $D_{tone}$ which is suited to the content of video corresponding to the selected display mode.

The tone curve $D_{tone}$ is expressed by, for example, data $D_{tone}(1)$ to data $D_{tone}(n)$ at an n-number of points. $D_{tone}(1)$ is indicative of the data of a tone curve which is applied to the lowest input luminance level, and $D_{tone}(2)$ and the following are indicative of the data of the tone curve, which are applied successively to higher input luminance levels.

The tone curve generator 701 outputs the generated tone curve $D_{tone}$ to the alpha blending module 705.

Figure 3:
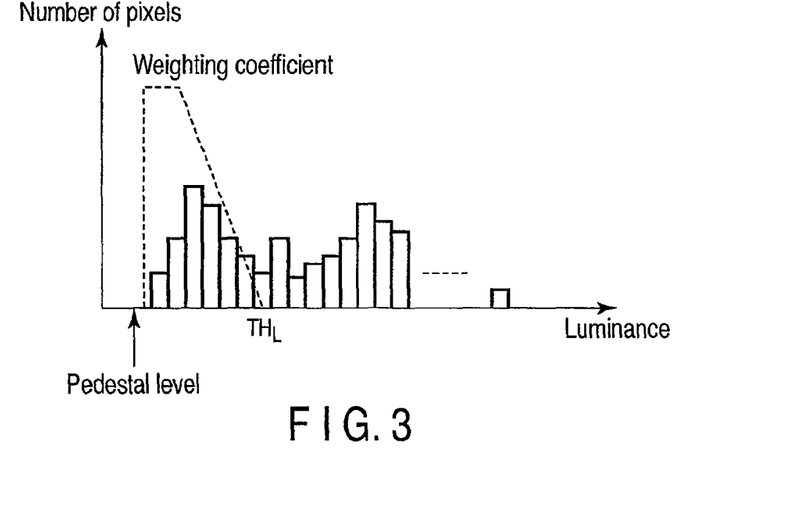
FIG. 3 is an exemplary view for explaining the size of dark region which is calculated by a dark region size calculator in the video processing apparatus according to the embodiment.

The dark region size calculator 702 calculates the size of dark region based on the luminance histogram. The histogram is indicative of the number of pixels at each luminance level, which is obtained by counting the pixels in the video frame that is the target of processing with respect to each luminance level. The dark region size calculator 702 calculates a value which is obtained by multiplying the number of pixels at each luminance level by a weight corresponding to the luminance level, and calculates the size of dark region which is the sum of the calculated values. FIG. 3 shows an example of calculation of the size of dark region by the dark region size calculator 702.

To begin with, using the numbers of pixels at the respective luminance levels, the dark region size calculator 702 calculates values which are obtained by multiplying the numbers of pixels, which correspond to luminance levels higher than a pedestal level and not higher than a threshold $TH_L$, by weighting coefficients which are set for the respective luminance levels. Then, the dark region size calculator 702 calculates the sum of the calculated values (weighted cumulative value). The calculated sum is indicative of the degree of concentration of pixels of a video frame at a low luminance level (dark region), and is also referred to as the size of dark region.

The threshold $TH_L$ is set at, e.g. 20 IRE. In some cases, a video signal of, e.g. a television broadcast program includes a signal which is transmitted in the state in which the luminance level corresponding to black is floated up to about 7 IRE. Thus, the threshold $TH_L$ is set at a value (e.g. 20 IRE) so as to cover luminance levels which are higher than a level (e.g. 7 IRE) that may possibly be used as a luminance level corresponding to black and include luminance levels necessary for understanding the tendency of the dark region.

The reason why the number of pixels corresponding to the pedestal level is not used for the calculation of the size of dark region is that if a side panel or a letter box, in which black (pedestal level) is set, is in a video image, the pixels corresponding to the side panel or letter box are prevented from affecting the size of dark region which is calculated.

As shown by a broken line in FIG. 3, the weighting coefficient, which is set for each luminance level, is large in the neighborhood of the darkest region and gradually decreases as the luminance level becomes higher. For example, the weighting coefficient is set at a value close to 1 (e.g. 255/256) in the neighborhood of the darkest region (0 to 7 IRE), and is set at a value close to 0 (e.g. 0/256) as the luminance level becomes higher. This aims at preventing the number of pixels corresponding to a luminance level near the upper limit of the range of luminance levels, which are targets of the dark region size calculation, from greatly affecting the size of dark region that is to be calculated. Thereby, the size of dark region can properly be calculated, for example, even with respect to such a video image that the number of pixels corresponding to a luminance level near the upper limit sharply increases.

The dark region size calculator 702 outputs the calculated size of dark region to the dark region blend correction value calculator 703. In the meantime, the dark region size calculator 702 may output the calculated size of dark region to the tone curve generator 701. In addition, the tone curve generator 701 may generate a tone curve which dynamically controls the contrast of video, based on the size of dark region.

The dark region blend correction value calculator 703 calculates a dark region blend correction value $Bld_L$ based on the size of dark region calculated by the dark region size calculator 702. The dark region blend correction value $Bld_L$ can take a value in the range of 0 to 1. The dark region blend correction value $Bld_L$ is indicative of the ratio (alpha value) of the effect of applying the tone curve $D_{tone}$, which is generated by the tone curve generator 701, to the dark region of video (e.g. 1 to n/2). In short, by the ratio that is set in the dark region blend correction value $Bld_L$, the effect of contrast control by the tone curve $D_{tone}$ is reflected on the dark region of video. In addition, by the remaining ratio (1-$Bld_L$) of the dark region blend correction value $Bld_L$, the effect of contrast control by the standard tone curve $D_{base}$ is reflected on the dark region of video. By the dark region blend correction value $Bld_L$, the contrast control effect (dynamic gamma effect) of the dark region can be increased even if the contrast control effect of the tone curve $D_{tone}$, which is generated by the tone curve generator 701, is weak (e.g. if the display mode is the cinema mode).

Figure 4:
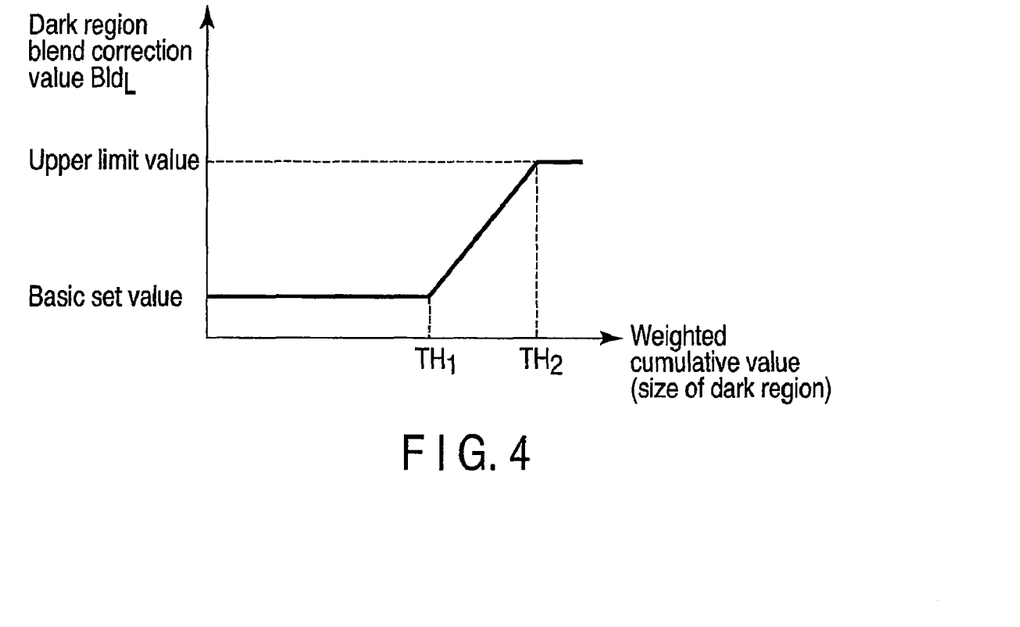
FIG. 4 is an exemplary view for explaining a dark region blend correction value which is calculated by a dark region blend correction value calculator in the video processing apparatus according to the embodiment.

The dark region blend correction value calculator 703 calculates the dark region blend correction value $Bld_L$, which corresponds to the calculated size of dark region, by using a conversion function which is indicative of the relationship between the size of dark region and the dark region blend correction value $Bld_L$. FIG. 4 shows an example of the conversion function indicative of the relationship between the size of dark region and the dark region blend correction value $Bld_L$. In this conversion function, if the size of dark region is 0 or more and is less than a first threshold $TH_1$, a basic set value is set for the dark region blend correction value $Bld_L$. This basic set value is, for instance, a value which is designated through a menu screen or the like (or a value corresponding to a designated display mode), or a preset prescribed value. If the size of dark region is the first threshold $TH_1$ or higher and is lower than a second threshold $TH_2$, a value, which linearly increases from the basic set value to the upper limit value as the size of dark region becomes larger, is set for the dark region blend correction value $Bld_L$. If the size of dark region is not lower than the second threshold $TH_2$, the upper limit value is set for the dark region blend correction value $Bld_L$. In the meantime, a value indicative of, for example, 60% of the number of all pixels of the video frame is set for the first threshold $TH_1$. In addition, a value indicative of, for example, 90% of the number of all pixels of the video frame is set for the second threshold $TH_2$. In other words, the dark region blend correction value $Bld_L$ is set such that a higher effect of tone curve $D_{tone}$ is reflected on the dark region of video as the size of dark region becomes larger.

The dark region blend correction value calculator 703 outputs the calculated dark region blend correction value $Bld_L$ to the blend parameter generator 704.

The blend parameter generator 704 generates a blend parameter Bld by using the dark region blend correction value $Bld_L$ calculated by the dark region blend correction value calculator 703, and a blend set parameter $Bld_U$ set by the user. The blend parameter Bld includes values of Bld(1) to Bld(n) in association with the tone curve $D_{tone}$ which is expressed by an n-number of points.

The blend parameter generator 704 sets that one of the blend set value $Bld_U$ set by the user, and the dark region blend correction value $Bld_L$, which is a value with a higher contrast control effect (i.e. a larger value), for the blend parameter Bld(i) of the dark region (e.g. Bld(1) to Bld(n/2)). In addition, the blend parameter generator 704 sets the blend set value Bld$_U$, which is set by the user, for the blend parameter Bld(i) of the light region (e.g. Bld(n/2+1) to Bld(n)).

For example, if the dark region blend correction value Bld$_L$ is Bld$_L$=0.6 and the blend set value Bld$_U$ set by the user is Bld$_U$=0.2, the blend parameter generator 704 sets 0.6 for the Bld(1) to Bld(n/2) which are blend parameters of the dark region, and sets 0.2 for the Bld(n/2+1) to Bld(n) which are blend parameters of the light region.

In addition, if dark region blend correction value Bld$_L$ is Bld$_L$=0.3 and the blend set value Bld$_U$ set by the user is Bld$_U$=0.4, the blend parameter generator 704 sets 0.4 for the Bld(1) to Bld(n/2) which are blend parameters of the dark region, and also sets 0.4 for the Bld(n/2+1) to Bld(n) which are blend parameters of the light region.

The blend parameter generator 704 outputs the calculated blend parameter Bld(i) to the alpha blending module 705.

The alpha blending module 705 generates the tone curve D$_{bld}$, on which the control effect by the tone curve D$_{tone}$ and the control effect by the tone curve D$_{base}$ are reflected at a ratio designated by the blend parameter Bld. The alpha blending module 705 generates the tone curve D$_{bld}$, for example, by the following equation:

$$D_{bld}(i)=D_{tone}(i) \times Bld(i)+D_{base}(i) \times (1-Bld(i)) \quad (1).$$

Figure 5:
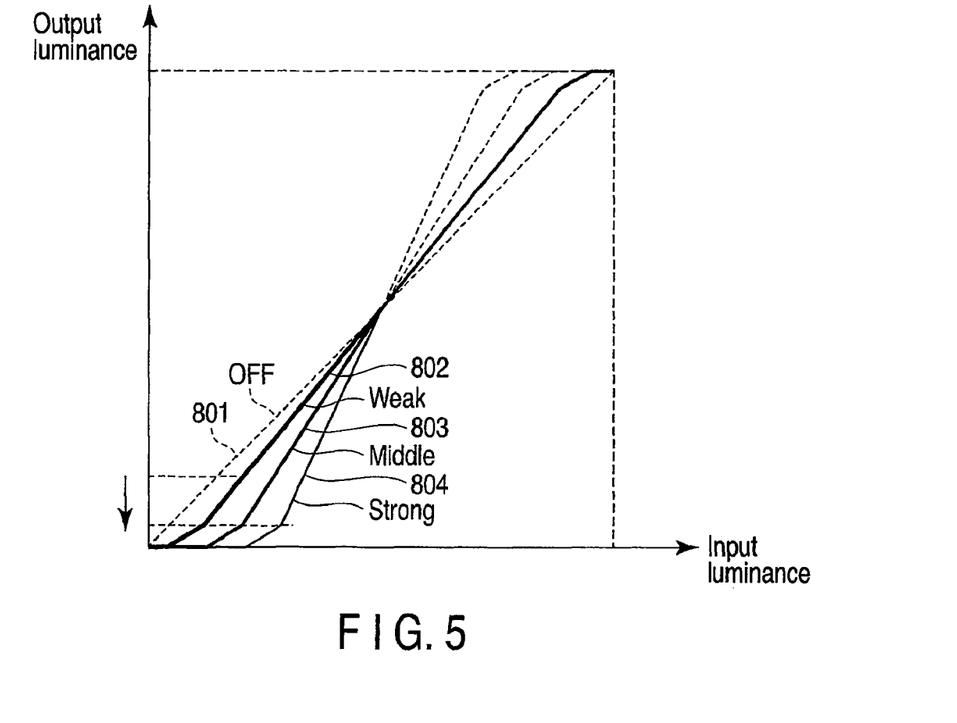
FIG. 5 is an exemplary view for explaining a tone curve which is calculated by an alpha blending module in the video processing apparatus according to the embodiment.

FIG. 5 shows examples of the tone curve D$_{bld}$ that is calculated by the alpha blending module 705. As shown in FIG. 5, if the blend parameter Bld is large (i.e. when the size of dark region is large), the alpha blending module 705 generates, for the dark region of video, the tone curve D$_{bld}$ on which the control effect by the tone curve D$_{tone}$ is greatly reflected. In other words, if the size of dark region is large, the alpha blending module 705 increases the dynamic gamma effect of the tone curve D$_{bld}$ applied to the dark region. For example, when it is assumed that the tone curve D$_{base}$ is a tone curve 801 and the tone curve D$_{tone}$ is a tone curve 804, the alpha blending module 705 generates, if the blend parameter Bld is large, a tone curve D$_{bld}$ 803 on which the control effect by the tone curve D$_{tone}$ is greatly reflected.

On the other hand, if the blend parameter Bld is small (i.e. when the size of dark region is small), the alpha blending module 705 generates, for the dark region of video, the tone curve D$_{bld}$ on which the control effect by the tone curve D$_{tone}$ is slightly reflected. For example, when it is assumed that the tone curve D$_{base}$ is the tone curve 801 and the tone curve D$_{tone}$ is the tone curve 804, the alpha blending module 705 generates, if the blend parameter Bld is small, a tone curve D$_{bld}$ 802 on which the control effect by the tone curve D$_{tone}$ is slightly reflected.

As shown in FIG. 5, the alpha blending module 705 generates, for the light region of video, the tone curve D$_{bld}$ on which the control effect by the tone curve D$_{tone}$ and the control effect by the tone curve D$_{base}$ are reflected at a prescribed ratio. The reason for this is that, as has been described above, the blend parameter Bld, for which the blend set value Bld$_U$ is set, is used for generating the tone curve D$_{bld}$ corresponding to the light part of the video signal. In the meantime, the blend set value Bld$_U$ is not limited to the value set by the user, and may be a preset value.

The video processor 62 calculates the output luminance level which is obtained by converting the input luminance level of video by using the generated tone curve D$_{bld}$. The video processor 62 outputs the calculated output luminance level of video to the video display 14.

Figure 6:
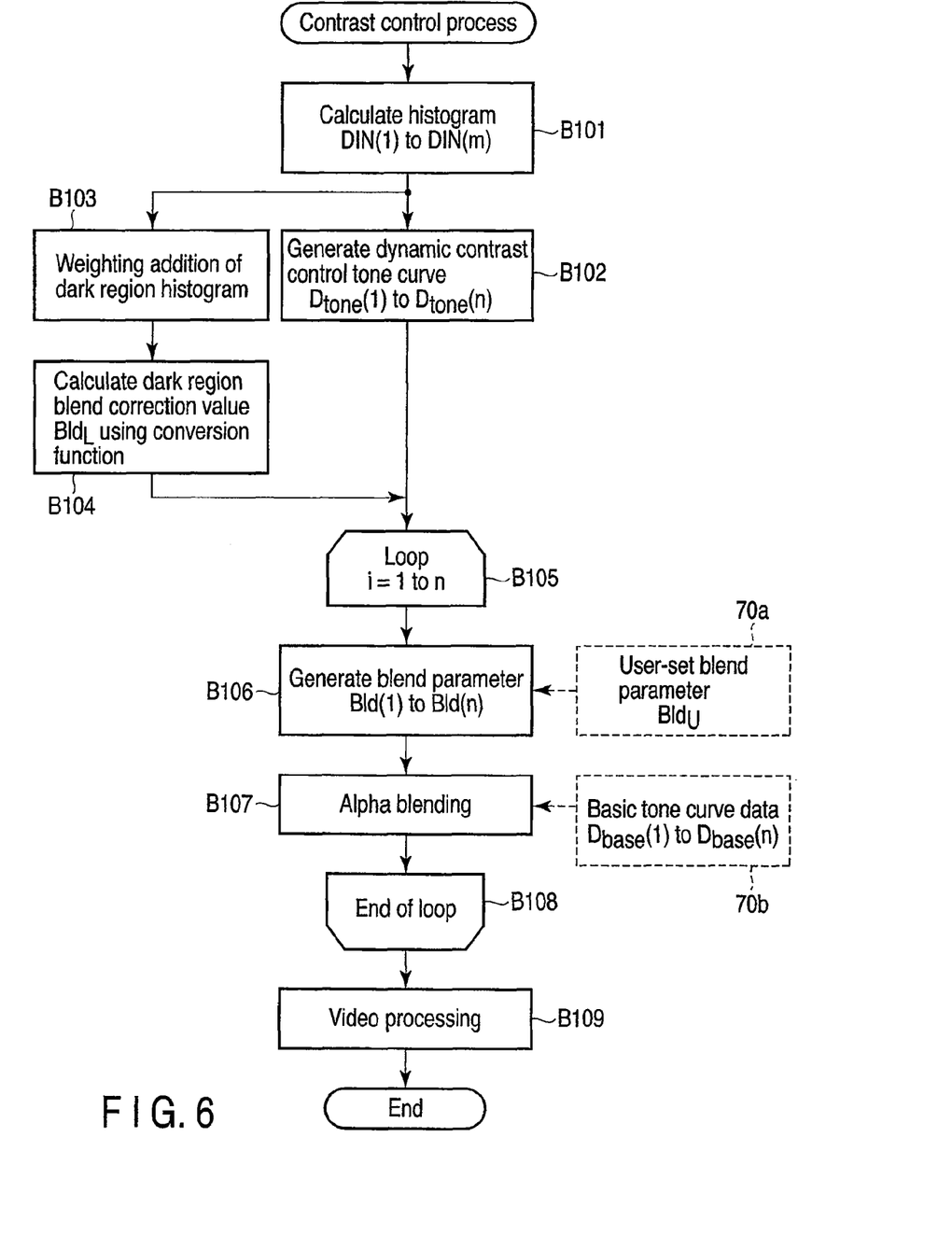
FIG. 6 is an exemplary flowchart illustrating the procedure of a contrast control process by the video processing apparatus according to the embodiment.

FIG. 6 is the flowchart illustrating an example of the procedure of the contrast control process by the contrast controller 70 with use of the luminance histogram calculated by the histogram calculator 69.

To start with, the histogram calculator 69 divides the dynamic range of luminance into an m-number of divisions, and then generates a luminance histogram based on the m-number of luminance levels (block B101). The histogram calculator 69 calculates the numbers of pixels, DIN(1) to DIN(m), for the respective luminance levels with respect to each of video frames, based on luminance levels of pixels of a video signal. The division number m of the luminance levels is set to be sufficiently fine (e.g. m=256).

Next, the contrast controller 70 (tone curve generator 701) generates a tone curve D$_{tone}$ for dynamically controlling the contrast, based on the calculated luminance histogram (block B102). The tone curve D$_{tone}$ is expressed by, for example, data D$_{tone}$(1) to data D$_{tone}$(n) at an n-number of points.

The contrast controller 70 calculates the size of dark region (the weighted cumulative value of dark region) based on the calculated luminance histogram (block B103). The contrast controller 70 (dark region size calculator 702) calculates, using the number of pixels at each luminance level, values which are obtained by multiplying the numbers of pixels, which correspond to luminance levels higher than the pedestal and not higher than the threshold TH$_L$, by weighting coefficients set for the respective luminance levels. Then, the contrast controller 70 (dark region size calculator 702) calculates the size of dark region, which is the sum of the calculated values. The size of dark region is indicative of the degree of concentration of pixels of a video frame at a low luminance level (dark region). The procedure of the dark region size calculation process in block B103 will be described later with reference to a flowchart of FIG. 7.

Subsequently, the contrast controller 70 (dark region blend correction value calculator 703) calculates a dark size blend correction value Bld$_L$ corresponding to the calculated size of dark region, by using the conversion function, as shown in FIG. 4, which is indicative of the relationship between the size of dark region and the dark region blend correction value Bld$_L$ (block B104).

Then, the contrast controller 70 sets 1 for the variable i for the repetitive process (loop) (block B105). The variable i can take a value in the range of 1 to n. The value n is the number of points (data) representing the tone curve, as described above.

The contrast controller 70 (blend parameter generator 704) generates a blend parameter Bld(i) by using the user-set blend parameter Bld$_U$ which is input, and the dark region blend correction value Bld$_L$ calculated in block B104 (block B106). The procedure of the blend parameter generation process in block B106 will be described later with reference to a flowchart of FIG. 8.

The contrast controller 70 (alpha blending module 705) performs alpha blending by using the input basic tone curve data D$_{base}$(i), the tone curve data D$_{tone}$(i) generated in block B102, and the blend parameter Bld(i) generated in block B106 (block B107). The contrast controller 70 (alpha blending module 705) generates the tone curve D$_{bld}$(i) of equation (1), on which the control effect by the tone curve D$_{tone}$(i) is reflected at a ratio designated by the blend parameter Bld(i), and on which the control effect by the tone curve D$_{base}$(i) is reflected at the remaining ratio.

Then, the contrast controller 70 determines whether the variable i is less than n (block B108). If the variable i is less than n, the contrast controller 70 increments the variable i by 1, and executes the process in the loop once again. If the variable i is not less than n, the contrast controller 70 finishes this repetitive process.

The video processor 62 calculates the output luminance level which is obtained by converting the input luminance level of video by using the generated tone curve $D_{bld}$ (block B109).

By the above-described process, it is possible to generate a video image with a large size of dark region, such as a video image including a dark scene, wherein the contrast is controlled so as to reduce the effect of black-floating. In other words, in a video image in which the luminance level of black pixels is set to be higher than the pedestal level, such a tone curve as to make the luminance level of black pixels close to the pedestal level is generated.

Figure 7:
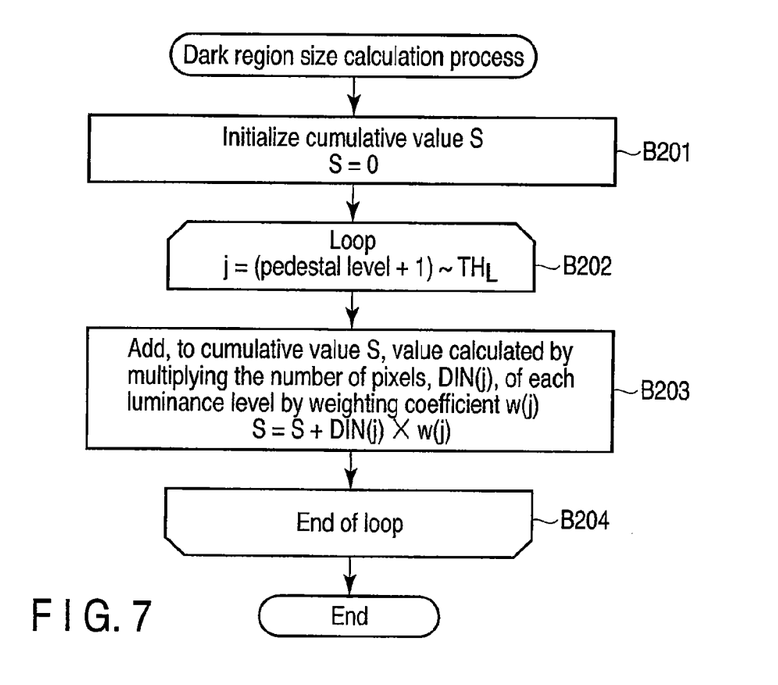
FIG. 7 is an exemplary flowchart illustrating the procedure of a dark region size calculation process by the video processing apparatus according to the embodiment.

FIG. 7 is the flowchart illustrating an example of the procedure of the dark region size calculation process corresponding to block B103 shown in FIG. 6. Using the numbers of pixels, DIN(1) to DIN(m), for the respective luminance levels, which are calculated with respect to each of video frames, the contrast controller 70 calculates the size of dark region (dark region weighted cumulative value) which is indicative of the degree of concentration of pixels of a video frame at a low luminance level (dark region).

To start with, the contrast controller 70 initializes a variable S for calculating a cumulative value (block B201). Specifically, the contrast controller 70 sets 0 for the variable S.

Next, the contrast controller 70 sets a luminance level, which is higher than the pedestal level by 1, for a variable j for the repetitive process (loop). The variable j can take a value in the range of between the value, which is higher than the pedestal level by 1, and the threshold $TH_L$. The threshold $TH_L$ is indicative of the maximum luminance level which is used for calculating the size of dark region. A value (e.g. 20 IRE), which includes a luminance level necessary for understanding the tendency of the dark region of video, is set for the threshold $TH_L$.

The contrast controller 70 adds to the variable S a value which is obtained by multiplying the number of pixels, DIN(j), of the luminance level j, by a weighting coefficient w(j) which corresponds to the luminance level (j) (block B203). In short, the contrast controller 70 calculates the value of the variable S by the following equation:

$$S=S+DIN(j) \times w(j) \quad (2).$$

Subsequently, the contrast controller 70 determines whether the variable j is less than the threshold $TH_L$ (block B204). If the variable j is less than the threshold $TH_L$, the contrast controller 70 adds 1 to the variable j, and executes the process in the loop once again. If the variable j is not less than the threshold $TH_L$, the contrast controller 70 sets the value, which is set for the variable S, for the size of dark region, and finishes the process.

By the above-described process, the contrast controller 70 calculates the size of dark region (dark region weighted cumulative value) which is indicative of the degree of concentration of pixels of a video frame at a low luminance level (dark region).

Figure 8:
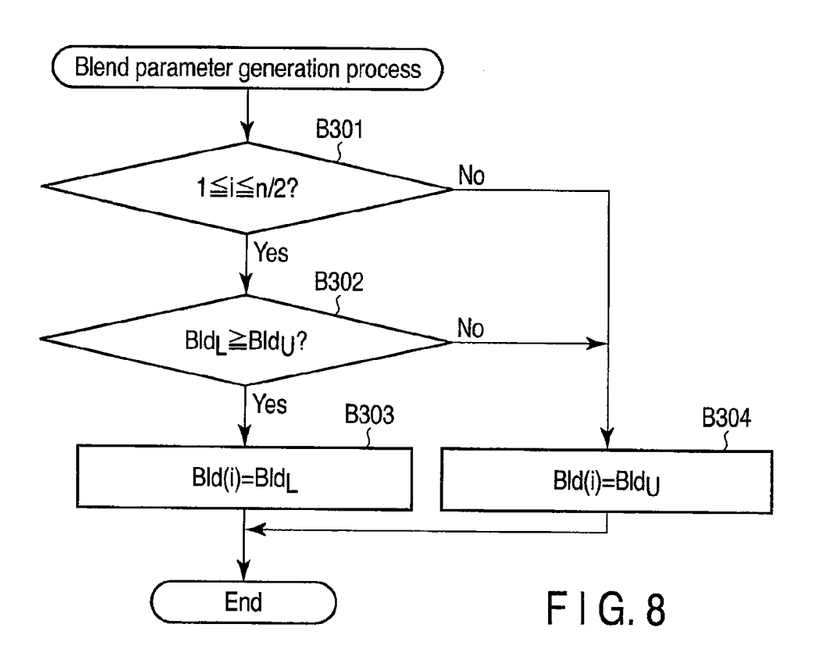
FIG. 8 is an exemplary flowchart illustrating the procedure of a blend parameter generation process by the video processing apparatus according to the embodiment.

FIG. 8 is the flowchart illustrating an example of the procedure of the blend parameter generation process corresponding to block B106 shown in FIG. 6. The contrast controller 70 determines the blend parameter Bld(i) based on the variable i, the user-set blend parameter $Bld_U$ and the dark region blend correction value $Bld_L$. The variable i is the value that is set in block B105 in FIG. 6. As has been described with reference to FIG. 6, the variable i can take a value in the range of 1 to n. The value n is the number of points (the number of data) representing the tone curve.

To start with, the contrast controller 70 determines whether the variable i is 1 or more and is n/2 or less (block B301). If the variable i is 1 or more and is n/2 or less (YES in block B301), the contrast controller 70 determines whether the dark region blend correction value $Bld_L$ is the user-set blend parameter $Bld_U$ or more (block B302). If the dark region blend correction value $Bld_L$ is the user-set blend parameter $Bld_U$ or more (YES in block B302), the contrast controller 70 sets the dark region blend correction value $Bld_L$ for the blend parameter Bld(i) (block B303).

If the variable i is greater than n/2 (NO in block B301) or if the dark region blend correction value $Bld_L$ is less than the user-set blend parameter $Bld_U$ (NO in block B302), the contrast controller 70 sets the user-set blend parameter $Bld_U$ for the blend parameter Bld(i) (block B304).

By the above-described process, the contrast controller 70 generates the blend parameter Bld(i). The contrast controller 70 sets that one of the user-set blend parameter $Bld_U$ and the dark region blend correction value $Bld_L$, which is a value with a higher contrast control effect (i.e. a larger value), for the blend parameter Bld(i) of the dark region (e.g. Bld(1) to Bld(n/2)). In addition, the contrast controller 70 sets the user-set blend parameter $Bld_U$, for the blend parameter Bld(i) of the light region (i.e. Bld(n/2+1) to Bld(n)).

Using the blend parameter Bld(i) set as described above, the contrast controller 70 performs blending of the tone curve. A video image is generated in which the tone curve $D_{tone}$ for dynamic contrast control and the standard tone curve $D_{base}$ are applied according to the blend parameter Bld(i) as shown in equation (1). Thereby, the effect of dynamic contrast control of dark region can be increased if the size of dark region (the ratio of low-luminance pixels in the video) is large.

The blend parameter Bld may not only be set at different values between the parameter applied to the dark region and the parameter applied to the light region, but also may be set at different values for arbitrary luminance levels. In short, the effect of dynamic contrast control can be designated at an arbitrary luminance level.

As has been described above, according to the present embodiment, black-floating of video can be improved by the tone correction based on the features of the video signal. The contrast controller 70 generates the tone curve $D_{bld}$ which is obtained by blending the tone curve $D_{tone}$ for dynamic contrast control and the standard (stipulated) tone curve $D_{base}$ in accordance with the blend parameter Bld based on the size of dark region. By tone-adjusting the input video signal based on the tone curve $D_{bld}$, the effect of dynamic contrast control of dark region can be enhanced if the size of dark region (the ratio of low-luminance pixels in the video) is large. Therefore, the effect of black-floating can be decreased in a video image, such as an image of a dark scene, in which the size of dark region is large. Thus, in the case of a video image in which the luminance level of pixels at which black is to be expressed is set to be higher than the pedestal level, the luminance level of pixels, at which black is to be expressed, can be made close to the pedestal level, and an image with an impression of sharp black can be provided.

In a liquid crystal display television including as a backlight an LED light source which is capable of partial control, since the backlight can be turned off in association with each of partial regions, jet black can be expressed. However, if black-floating occurs in a video signal, the function that can display jet black cannot effectively be utilized. Even in the case of the liquid crystal display television having the LED light source as backlight, the floating of the black level can be suppressed and the black level can be made close to jet black by applying the contrast control process according to the present embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video processing apparatus comprising:
    a histogram generating module configured to generate a histogram by calculating numbers of pixels for luminance levels with respect to each frame of a video signal, based on the luminance levels of the pixels of the video signal;
    a dark region cumulative value calculating module configured to calculate a sum of the numbers of pixels for luminance levels which are higher than a pedestal level and lower than a threshold among the luminance levels with respect to each frame of the video signal;
    a blend correction value calculating module configured to calculate a blend correction value corresponding to the sum, using a predetermined conversion function;
    a tone curve generating module configured to generate a first tone curve which controls luminance values of the video signal based on the histogram;
    a blend parameter generating module configured to generate blend parameters for blending the first tone curve and a prescribed tone curve, the blend parameters comprising a blend parameter that is set to be a greater one of the blend correction value and a predetermined blend set value and applied to a luminance level less than a first luminance level, and a blend parameter that is set to be the predetermined blend set value and applied to a luminance level not less than the first luminance level; and
    a blending module configured to generate a second tone curve by blending the first tone curve and the prescribed tone curve based on the blend parameters,
    wherein each of the modules is hardware or a hardware and software combination.

2. The video processing apparatus of claim 1, wherein the blend parameters are indicative of ratios at which an effect of the first tone curve is reflected on the second tone curve.

3. The video processing apparatus of claim 1, wherein the dark region cumulative value calculating module is configured to calculate a sum of values which are calculated by multiplying the numbers of pixels, which correspond to luminance levels higher than the pedestal level and not higher than the threshold, by weighting coefficients corresponding to the luminance levels.

4. The video processing apparatus of claim 3, wherein the weighting coefficients are set to become lower as the luminance level becomes higher.

5. The video processing apparatus of claim 1, further comprising a tone correction module configured to convert the video signal based on the second tone curve.

6. A video processing method comprising:
    generating a histogram by calculating numbers of pixels for luminance levels with respect to each frame of a video signal, based on the luminance levels of the pixels of the video signal;
    calculating a sum of the numbers of pixels for luminance levels, which are higher than a pedestal level and lower than a threshold among the luminance levels with respect to each frame of the video signal;
    calculating a blend correction value corresponding to the sum, using a predetermined conversion function;
    generating a first tone curve which controls luminance values of the video signal based on the histogram;
    generating blend parameters for blending the first tone curve and a prescribed tone curve, the blend parameters comprising a blend parameter that is set to be a greater one of the blend correction value and a predetermined blend set value and applied to a luminance level less than a first luminance level, and a blend parameter that is set to be the predetermined blend set value and applied to a luminance level not less than the first luminance level; and
    generating a second tone curve by blending the first tone curve and the prescribed tone curve based on the blend-parameters.

* * * * *